United States Patent
Hsu

(10) Patent No.: US 7,313,655 B2
(45) Date of Patent: Dec. 25, 2007

(54) METHOD OF PREFETCHING USING A INCREMENTING/DECREMENTING COUNTER

(75) Inventor: Wenchi Hsu, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 400 days.

(21) Appl. No.: 10/711,792

(22) Filed: Oct. 6, 2004

(65) Prior Publication Data

US 2005/0076181 A1  Apr. 7, 2005

Related U.S. Application Data

(60) Provisional application No. 60/481,475, filed on Oct. 7, 2003.

(51) Int. Cl.
G06F 12/00 (2006.01)
G06F 13/00 (2006.01)
G06F 13/28 (2006.01)

(52) U.S. Cl. ............... 711/137; 711/167; 711/168; 711/169; 712/207

(58) Field of Classification Search ............... 711/137
See application file for complete search history.

(56) References Cited

U.S. PATENT DOCUMENTS

| 5,038,278 | A  | * | 8/1991  | Steely et al.   | 711/133 |
|-----------|----|---|---------|-----------------|---------|
| 5,719,800 | A  | * | 2/1998  | Mittal et al.   | 713/321 |
| 6,654,873 | B2 | * | 11/2003 | Kadowaki        | 712/207 |
| 6,792,524 | B1 | * | 9/2004  | Peterson et al. | 712/235 |
| 2004/0003179 | A1 | * | 1/2004 | Shirahige et al. | 711/137 |
| 2004/0117556 | A1 | * | 6/2004 | Kadi           | 711/137 |
| 2004/0148464 | A1 | * | 7/2004 | Jang           | 711/120 |
| 2005/0210202 | A1 | * | 9/2005 | Choubal et al. | 711/138 |
| 2006/0224872 | A1 | * | 10/2006 | Shihadeh      | 712/239 |

* cited by examiner

*Primary Examiner*—Donald Sparks
*Assistant Examiner*—Prasith Thammavong
(74) *Attorney, Agent, or Firm*—Winston Hsu

(57) ABSTRACT

The present invention provides a pre-fetch controller and a method thereof for efficiently pre-fetching data from a memory device. The method includes initializing a counter value; fetching a data from the memory and subtracting the counter value by a first value when a pre-fetching is activated; adding a second value to the counter value when a cache hit occurs; comparing the counter value with a first threshold value; and when the counter value is smaller than the first threshold value, stopping pre-fetching the data from the memory.

12 Claims, 3 Drawing Sheets

METHOD OF PREFETCHING USING A INCREMENTING/DECREMENTING COUNTER

CROSS REFERENCE TO RELATED APPLICATIONS

This application claims the benefit of U.S. Provisional Application No. 60/481,475, which was filed on Oct. 7, 2003 and entitled "Dynamic Prefetch Method".

BACKGROUND OF INVENTION

1. Field of the Invention

The present invention relates to a device for fetching data stored in a memory and a method thereof. More specifically, the present invention relates to a pre-fetch controller for efficiently pre-fetching data stored in a memory and a method thereof.

2. Description of the Prior Art

A computer generally contains a calculating unit (for example, a CPU), and a storage unit (for example, a DRAM) where the data and instructions are stored, and the calculating unit fetches the required data and instructions from the storage unit to perform a predetermined logic operation. In addition, the calculating unit also stores the output of the predetermined logic operation back into the storage unit. As chip fabrication technology advances, CPU clock speeds are increasing more rapidly than DRAM speeds, so the clock speed of the CPU is generally higher than that of the DRAM, i.e., the data processing speed of the CPU is higher than that of the DRAM. After the CPU sends out a fetch instruction to fetch a given piece of data from the DRAM, the CPU must wait until the DRAM reads and sends back that data to the CPU. Consequently, the operating efficiency of the CPU is lowered due to the delay caused by the DRAM. To alleviate this, a cache is introduced to reduce delay. Comparing with the prior art DRAM, the cache (for example, SRAM) has a higher speed of data access. The storage capacity of the cache (for example, L2 cache in a CPU) in a computer is usually much smaller than that of the DRAM because the high cost.

FIG. 1 shows the block diagram of a prior art data processing system 10. The data processing system 10 contains a cache 12, a pre-fetch controller 14, a memory controller 16, and a DRAM 18. As mentioned above, the data access speed of the cache 12 is higher than that of the DRAM 18; therefore, when the CPU is performing a logic operation, the operating efficiency of the CPU can be increased if the CPU can get the required data directly from the cache 12. To increase the efficiency of the CPU, the pre-fetch controller 14 predicts that DATAa, DATAb, and DATAc in the DRAM 18 will be required when the CPU is performing a given logic operation, and then tells the memory controller 16 to read DATAa, DATAb, and DATAc from the DRAM 18 and send them to the cache. Accordingly, when the cache 12 is subsequently searched by the CPU, if DATAa, DATAb, and DATAc are the required data when the CPU is performing the logic operation, then a "cache hit" occurs for each of DATAa, DATAb, and DATAc, and the CPU can access DATAa, DATAb, and DATAc directly from the cache 12 to perform the logic operation. However, generally, the prediction of the pre-fetch controller 14 does not exactly match the data required during the logic operation. That is, the pre-fetch controller 14 predicts that DATAa, DATAb, and DATAc will be required during the logic operation, but DATAa, DATAb, and DATAd stored in the DRAM 18 are actually required instead. Thus, when the CPU executes the logic operation, cache hits occur when the CPU searches for DATAa and DATAb in the cache 12, and so the CPU accesses DATAa and DATAb successfully from the cache 12. However, a "cache miss" occurs when the CPU searches for DATAd in the cache 12, and so the CPU must fetch DATAd from the DRAM 18 via the memory controller 16, and DATAd will then be stored in the cache 12 and transmitted to the CPU at the same time. In short, the CPU must wait until it receives DATAd from the DRAM 18, and only thereafter can the logic operation execution continue.

In conclusion, because DATAc is not the required, the pre-fetch controller 14 wastes the bandwidth between the memory controller 16 and the DRAM 18 when it pre-fetches DATAc from the DRAM 18. As a result, if the accuracy of the pre-fetch controller 14 is too low, i.e., if "cache miss" occurs too frequently when the CPU is searching the cache 12 for required data, then the pre-fetch action will seriously lower the efficiency of the computer.

SUMMARY OF INVENTION

It is therefore the present invention provides a pre-fetch controller for efficiently pre-fetching data stored in a memory and a per-fetch method thereof.

According to one preferred embodiment of the present invention, a method for pre-fetching data from a memory is disclosed. The method includes: setting a counter value; pre-fetching data from the memory and subtracting the counter value by a first value when a pre-fetching is activated; adding a second value to the counter value when a cache hit; comparing the counter value with a first threshold value; and when the counter value is smaller than the first threshold value, stopping pre-fetching data from the memory.

According to another preferred embodiment of the present invention, a pre-fetch controller for pre-fetching data from a memory and providing data to a logic operation unit is also disclosed. The pre-fetch controller includes: a register for storing a counter value; and a controller connected to the register for changing the counter value when a pre-fetching is activated or when a cache hit occurs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
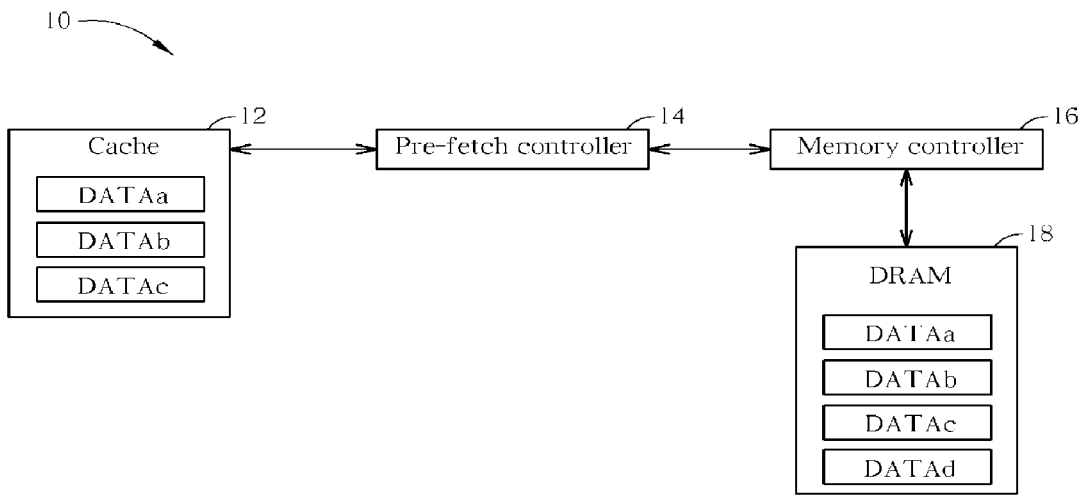
FIG. 1 is a block diagram of a data processing system of the prior art.
Figure 2:
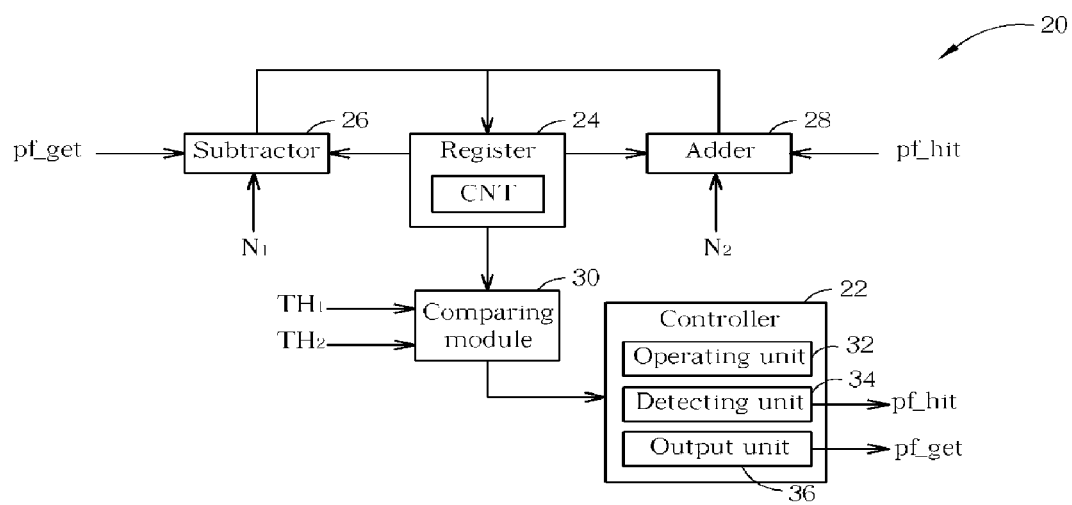
FIG. 2 is a block diagram of a first preferred embodiment of a pre-fetch controller according to the present invention.

FIG. 2 shows a block diagram of pre-fetch controller 20 of a first preferred embodiment according to the present invention. The pre-fetch controller 20 includes a controller 22, a counter value register 24, a subtractor 26, an adder 28 and a comparing module 30. The controller 22 further includes an operating unit 32, a detecting unit 34 and an output unit 36. In addition, the counter value register 24 has a counter value CNT. Please note that the subtractor 26 can be replaced by an adder combined with an XOR logic circuit as known in the industry. The detailed pre-fetch method of the pre-fetch controller 20 is as follows. First, when the pre-fetch controller 20 is initialized, the counter value CNT in the counter value register 24 will be initialized; for example, if the counter value register 24 is 10 bits wide, i.e., the smallest value of the counter value CNT equals "0000000000" and the biggest value equals "1111111111", then the initial value of the counter value CNT must be set between the largest and the smallest values. In this embodiment, the initial value is set to "0000011111" (assumed, not limited). Next, the operating unit 32 of the controller 22 predicts the data required while the CPU is executing the logic operations and generating the corresponding data requests. The data requests are transmitted to the memory controller 16 shown in FIG. 1 via output unit 36 so as to read the data in the DRAM 18. In addition, when the output unit 36 outputs a data request, a controlling signal pf_get will be sent which causes the subtractor 26 to subtract a first value N1 from the counter value CNT, and the counter value CNT in the counter value register 24 is updated to be the resulting value.

While the CPU performs the logic operation, the detecting unit 34 of the controller 22 determines whether the required data matches the data corresponding to the data request which is generated by the operating unit 32. If the data corresponding to the data request matches the data required by the CPU, the detecting unit 34 will output a controlling signal pf_hit which causes the adder 28 to add a second value N2 to the counter value CNT, and the counter value CNT in the counter value register 24 is updated to be the resulting value.

As mentioned above, the controlling signal pf_get indicates that the pre-fetch controller 20 pre-fetches a data from the DRAM shown in FIG. 1, and the controlling signal pf_hit indicates that the data pre-fetched by the pre-fetch controller 20 matches the data required by the CPU. Generally, the prediction of the pre-fetch controller 20 does not always match the data required during the logic operation; therefore, it is probablily that the detecting unit 34 will generate a controlling signal pf_hit after the output unit 36 sends a plurality of controlling signals pf_get. The ratio of the controlling signals pf_hit to the controlling signals pf_get is the prediction accuracy of the pre-fetch controller 20. In other words, the higher the prediction accuracy of the pre-fetch controller 20, the more times the controlling signal pf_hit occurs. In this embodiment, it is assumed that the CPU is maintaining adequate efficiency when the ratio of the controlling signals pf_hit to the controlling signals pf_get is A:B, so the ratio of the first value N1 to the second value N2 is set to be A:B. For example, if the ratio of the controlling signal pf_hit to the controlling signal pf_get is 1:4, the efficiency of the pre-fetch controller 22 is regarded as adequate, and hence the ratio of the first value N1 to the second value N2 is chosen to be 1:4. Therefore, in this embodiment the values of the first value N1 and the second value N2 are set to be 1 and 4 respectively. As a result, when the output unit 36 generates a controlling signal pf_get, the counter value CNT is decreased by 1, and when the detecting unit 34 generates a controlling signal pf_hit, the counter value CNT is increased by 4.

The initial value of the counter value CNT is "0000011111", and hence if one controlling signal pf_hit is generated by the detecting unit 34 for every 4 controlling signals pf_get which are generated by the output unit 36, the counter value CNT will maintain its initial value "0000011111". If fewer than one controlling signal pf_hit is generated by the detecting unit 34 for every 4 controlling signals pf_get which are generated by the output unit 36, the counter value CNT will decrease from "0000011111" and tend toward "0000000000". In other words, when the counter value CNT decreases, this indicates that the prediction accuracy of the pre-fetch controller 20 is bad and the memory bandwidth efficiency is low. Conversely, if more than one controlling signal pf_hit is generated by the detecting unit 34 for every 4 controlling signals pf_get which are generated by the output unit 36, the counter value CNT will increase from the initial value "0000011111" and tend toward "1111111111". In other words, when the counter value CNT increases, this indicates that the prediction accuracy of the pre-fetch controller 20 is good and so is the memory bandwidth efficiency.

In this embodiment, the comparing module 30 compares the counter value CNT with a threshold value TH1 which is less than the above-mentioned initial value "0000011111". As mentioned above, bad prediction accuracy of the pre-fetch controller 20 means that the occurrence rate of the controlling signal pf_hit decreases, so the counter value CNT tends toward the minimum value "0000000000". When the prediction accuracy of the pre-fetch controller 20 is too low, cache misses continue occurring when the CPU is searching the cache shown in FIG. 1. The pre-fetch action performed by the pre-fetch controller 20 will reduce the efficiency of the whole computer system. Therefore, when the comparing module 30 determines that the counter value CNT is smaller than the threshold value TH1, it will drive the controller 22 to stop the output unit 36. That is, the output unit 36 will stop transmitting the data requests generated by the operating unit 32 to the memory controller 16 shown in FIG. 1, and the output unit 36 will stop generating the controlling signal pf_get to the subtractor 26. As a result, the counter value CNT will stop decreasing when the output unit 36 stops outputting the controlling signal pf_get.

The operating unit 32 and the detecting unit 34 are still operating normally at this point. The operating unit 32 continues to predict the required data when the CPU executes the logic operation and generates the corresponding data requests. The detecting unit 34 will detect the data in the DRAM 18 corresponding to the data and the data fetched by the CPU from the DRAM 18 as the logic operation is being executed. Although the output unit 36 doesn't output the data requests to the memory controller 16 to perform the pre-fetch action, the detecting unit 34 continues detecting whether the result detected by the operating unit 32 is correct. When the detecting unit 34 detects that the data predicted by the operating unit 32 is the same as the data in the DRAM fetched by the CPU, the detecting unit 34 generates the controlling signal pf_hit, and hence the adder 28 is signaled to increase the counter value CNT. In short, when the output unit 36 stops outputting the controlling signal pf_get, the counter value CNT stops decreasing. That is, the counter value CNT increases gradually because the detecting unit 34 continues outputting the controlling signal pf_hit.

In this embodiment, the comparing module 30 compares the counter value CNT with a threshold value TH2 to determine whether to signal the controller 22 to restart the output unit 36. The threshold value TH2 is larger than the threshold value TH1 and is also larger than the above-mentioned initial value "0000011111". If the threshold value TH2 is equal to the threshold value TH1, the pre-fetch controller 20 would cycle continuously between switching on and switching off the output unit 36. Therefore, to avoid this situation, different threshold values TH1 and TH2 are used in the pre-fetch controller 20 in the present invention. When the counter value CNT is larger than the threshold value TH2, the output unit 36 restarts. If the prediction accuracy of the pre-fetch controller 20 is not improved, i.e., the occurring rate of the controlling signal pf_hit is too low, the counter value CNT decreases rapidly. When the counter value CNT is smaller than the threshold value TH1 again, the comparing module 30 tells the controller 22 to suspend the function of the output unit 36; therefore, the bandwidth usage between the memory controller 16 and the DRAM 18 is reduced.

Figure 3:
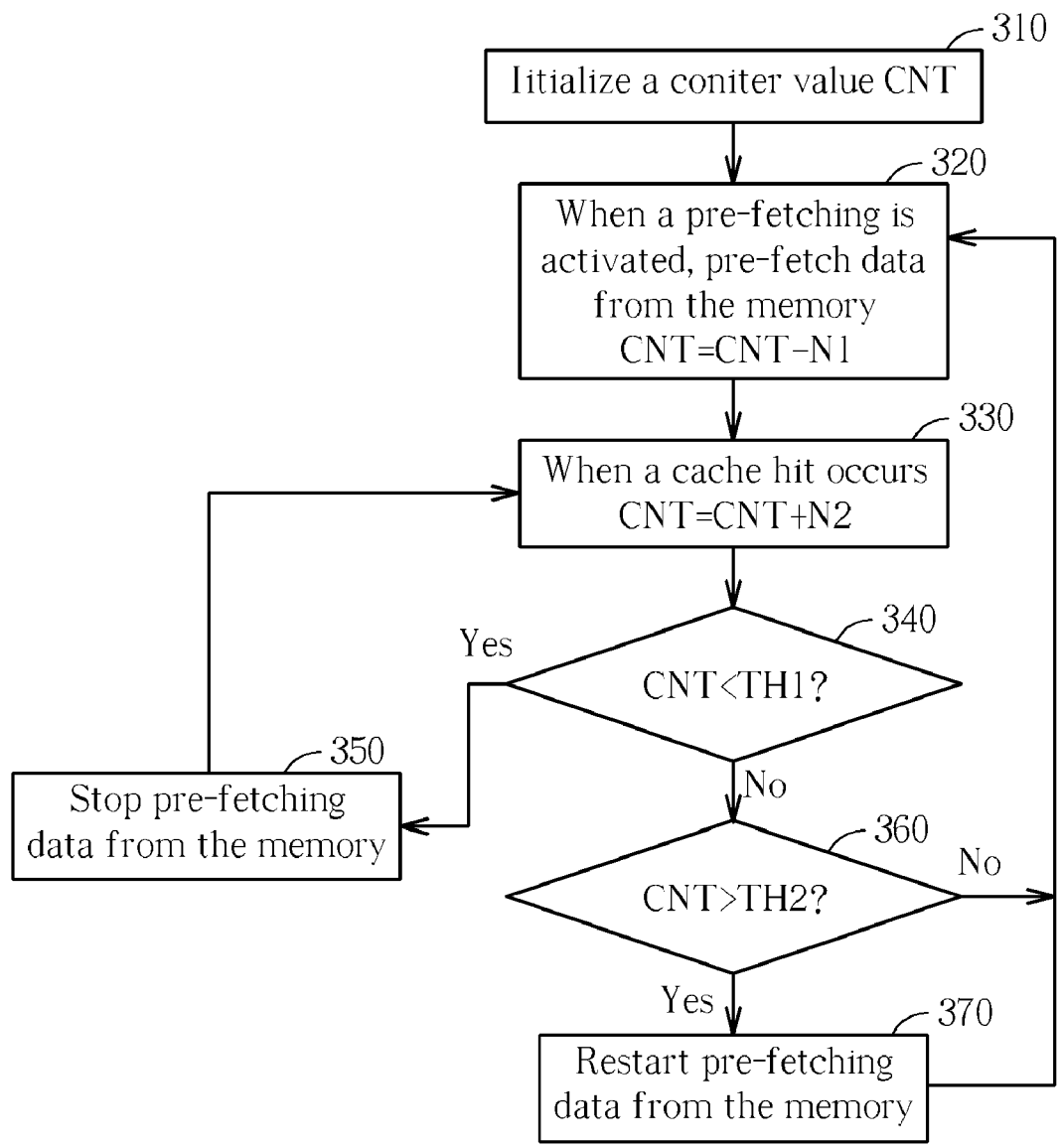
FIG. 3 is a flowchart of a preferred embodiment of a pre-fetch method according to the present invention.

FIG. 3 is the flowchart of the first embodiment according to the present invention. When the pre-fetch action is performed, the counter value CNT will be decreased by the first value N1, and when a cache hit occurs, the counter value CNT will be increased by the second value N2. The prediction accuracy is determined to be too low when the counter value CNT is smaller than the threshold value TH1, at which point accessing the data in the memory will be stopped. The pre-fetch action is still carried out at this time, but the counter value CNT will not be decreased. However, when a cache hit occurs, the counter value CNT will be increased by the second value N2, and the memory controller 16 will be restarted to access data in the memory once the counter value CNT is larger than the threshold value TH2.

Figure 4:
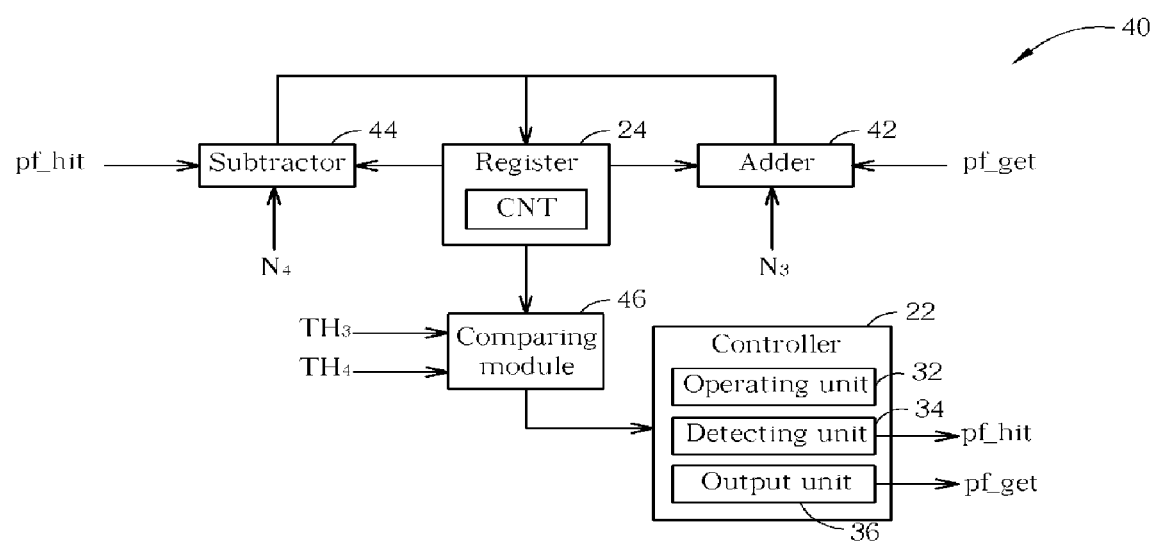
FIG. 4 is a block diagram of a second preferred embodiment of the pre-fetch controller according to the present invention.

In summary, the output unit 36 is initially turned on, and the output unit 36 will be shut down when the counter value CNT becomes smaller than the threshold value TH1, and the output unit 36 will be restarted when the counter value CNT becomes larger than the threshold value TH2. However, the pre-fetch controller 20 in the present invention can also shut down the output unit 36, when it is in operation, when the counter value CNT is larger than a first threshold value, and can restart the output unit 36, when it is shut down, when the counter value CNT is smaller than a second threshold value, as shown in FIG. 2 and FIG. 3. FIG. 4 is the block diagram of the function of a second preferred embodiment of the pre-fetch controller 40. Most of the common devices of the pre-fetch controller 40 shown in FIG. 4 and of the pre-fetch controller 20 shown in FIG. 2 possess the same function, and therefore, they are not discussed again. The major differences are the operations of the adder 42, the subtractor 44 and the comparing module 46. In this embodiment, when the output unit 36 outputs a controlling signal pf_get, the adder 42 increases the counter value CNT by a number N3, and the resulting value is set to be the new value of the counter value CNT. When the detecting unit 34 outputs a controlling signal pf_hit, the subtractor 44 decreases the counter value CNT by a number N4, and the resulting value is set to be the new value of the counter value CNT. The rule for setting the numbers N3 and N4 is the same as that for setting the numbers N1 and N2. Accordingly, the ratio of N3 and N4 corresponds to the prediction accuracy of the pre-fetch controller 40.

As to the embodiment shown in FIG. 2, the adder 28 increases N2 to the counter value CNT when the detecting unit 34 outputs a controlling signal pf_hit, and the subtractor 26 decreases N1 to the counter value CNT when the output unit 36 outputs a controlling signal pf_get. Referring back to FIG. 4, however, according to the present invention, the adder 42 increases N3 to the counter value CNT when the detecting unit 34 outputs a controlling signal pf_get, and the subtractor 44 decreases N4 to the counter value CNT when the output unit 36 outputs a controlling signal pf_hit.

In the second embodiment, the initial value of the counter value CNT is "0000011111" (assumed, not limited), and hence if exactly one controlling signal pf_hit is generated by the detecting unit 34 for every 4 controlling signals pf_get that are generated by the output unit 36, the counter value CNT will maintain its initial value "0000011111". If fewer than one controlling signal pf_hit is generated by the detecting unit 34 for every 4 controlling signals pf_get that are generated by the output unit 36, the counter value CNT will larger than "0000011111" and tend toward "1111111111". In other words, when the counter value CNT increases, the prediction accuracy of the pre-fetch controller 40 is bad and the efficiency is poor. Conversely, if more than one controlling signal pf_hit is generated by the detecting unit 34 for every 4 controlling signals pf_get which are generated by the output unit 36, the counter value CNT will smaller than the initial value "0000011111" and tend toward "0000000000". In other words, when the counter value CNT decreases, the prediction accuracy of the pre-fetch controller 40 is good and so is the memory bandwidth efficiency.

The comparing module 46 compares the counter value CNT with a threshold value TH3 which is larger than the above-mentioned initial value "0000011111". When the comparing module 46 determines the counter value CNT is larger than the threshold value TH3, the signal the controller 22 stops the output unit 36. That is, the output unit 36 will stop transmitting the data requests generated by the operating unit 32 to the memory controller 16 shown in FIG. 1, and the output unit 36 will stop generating the controlling signal pf_get to the adder 42. In summary, the counter value CNT stops increasing when the output unit 36 stops outputting the controlling signal pf_get. The detecting unit 34 continues detecting whether the result detected by the operating unit 32 is correct. When the detecting unit 34 detects that the data predicted by the operating unit 32 is the same as the data in the DRAM 18 fetched by the CPU, the detecting unit 34 generates the controlling signal pf_hit, and hence the subtractor 44 decreases N4 to the counter value CNT. That is, the counter value CNT decreases gradually because the detecting unit 34 continues outputting the controlling signal pf_hit.

The comparing module 46 compares the counter value CNT with a threshold value TH4 to determine whether to signal the controller 22 to restart the output unit 36. The threshold value TH4 is smaller than both the threshold value TH3 and the above-mentioned initial value "0000011111". When the counter value CNT is smaller than the threshold value TH4, the output unit 36 restarts. If the prediction accuracy of the pre-fetch controller 40 is not improved, i.e., the occurring rate of the controlling signal pf_hit is still too low, the counter value CNT will increase rapidly. When the counter value CNT is larger than the threshold value TH3 again, the comparing module 30 tells the controller 22 to suspend the function of the output unit 36; therefore, the bandwidth usage between the memory controller 16 and the DRAM 18 is reduced.

The pre-fetch controller of the present invention and the method thereof continues monitoring the prediction accuracy and dynamically adjusts a counter value. When the prediction accuracy of the pre-fetch controller is poor, the counter value reaches a threshold value, and as a result the pre-fetch controller of the present invention and the method thereof will stop the pre-fetch operation so as to reduce the consumption of memory bandwidth caused by too many cache misses. In addition, the above-mentioned numbers N1, N2, N3, N4 and threshold values TH1, TH2, TH3, TH4 are programmable. Therefore, the pre-fetch controller of the present invention and the method thereof can flexibly set the numbers N1, N2, N3, N4 and the threshold values TH1, TH2, TH3, TH4 to further tune the efficiency of the pre-fetch controller. Moreover, because the pre-fetch controller of the present invention utilizes simple circuits to calculate the counter value to control the pre-fetch operation, the system costs little and is easily implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for pre-fetching data from a memory, comprising the steps of:

initializing a counter value;

pre-fetching a predetermined data from the memory and subtracting a first value from the counter value each time pre-fetching is activated;

adding a second value to the counter value when a cache hit occurs;

comparing the counter value with a first threshold value; and when the counter value is smaller than the first threshold value, stopping pre-fetching data from the memory.

2. The method of claim 1, wherein when the pre-fetching is stopped, the counter value is blocked from being decreased by the first value.

3. The method of claim 2, wherein when the pre-fetching is stopped and the cache hit occurs, the second value is added to the counter value.

4. The method of claim 3, wherein when the pre-fetching is stopped and the counter value is larger than a second threshold value, pre-fetching data from the memory is restarted.

5. The method of claim 4, wherein the second threshold value is larger than the first threshold value.

6. The method of claim 1, wherein the second value is an integer multiple of the first value.

7. A method for pre-fetching data from a memory, comprising the steps of:

initializing a counter value;

pre-fetching a predetermined data from the memory and adding a first value to the counter value each time pre-fetching is activated;

subtracting a second value from the counter value when a cache hit occurs;

comparing the counter value with a first threshold value; and when the counter value is larger than the first threshold value, stopping pre-fetching data from the memory.

8. The method of claim 7, wherein when the pre-fetching is stopped, the counter value is blocked from being increased by the first value.

9. The method of claim 8, wherein when the pre-fetching is stopped and the cache hit occurs, the counter value is decreased by the second value.

10. The method of claim 9, wherein when the pre-fetching is stopped and the counter value is smaller than a second threshold value, pre-fetching data from the memory is restarted.

11. The method of claim 10, wherein the second threshold value is smaller than the first threshold value.

12. The method of claim 7, wherein the second value is an integer multiple of the first value.

* * * * *